(12) United States Patent
King et al.

(10) Patent No.: US 8,509,983 B2
(45) Date of Patent: Aug. 13, 2013

(54) DIESEL-EXHAUST-FLUID REFILL DETECTION

(75) Inventors: Matthew King, Waterford, MI (US); Rebecca J. Darr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 12/944,798

(22) Filed: Nov. 12, 2010

(65) Prior Publication Data
US 2012/0123630 A1 May 17, 2012

(51) Int. Cl.
*F01N 11/00* (2006.01)

(52) U.S. Cl.
USPC .......................................... 701/29.1; 60/274

(58) Field of Classification Search
USPC .................... 701/29, 29.1, 99, 108, 109, 101; 423/212, 213.2, 235, 239.1; 60/274, 286, 60/295, 303, 277, 301, 272
See application file for complete search history.

(56) References Cited

U.S. PATENT DOCUMENTS

| | | | |
|---|---|---|---|
| 6,758,187 B2 * | 7/2004 | Waters | 123/198 F |
| 7,954,312 B2 * | 6/2011 | Gresens | 60/286 |
| 8,117,834 B2 * | 2/2012 | Toshioka et al. | 60/301 |
| 2011/0301808 A1 * | 12/2011 | Chaineux et al. | 701/34 |

FOREIGN PATENT DOCUMENTS

DE 19914726 A1 12/1999

* cited by examiner

*Primary Examiner* — Dalena Tran
(74) *Attorney, Agent, or Firm* — Quinn Law Group, PLLC

(57) ABSTRACT

A method is provided for detecting a level of diesel-exhaust-fluid (DEF) in a reservoir that is operatively connected to a catalyst for a diesel engine. The method is employed in a vehicle in order to facilitate a refill of the reservoir. The method includes sensing a level of diesel fuel in a fuel tank via a sensor operatively connected to the tank. The method also includes determining whether the vehicle is on an incline using the sensed level of diesel fuel in the fuel tank. The method additionally includes determining the level of DEF in the reservoir if the vehicle is determined to be substantially not on an incline. A system is also provided for detecting a level of DEF in the reservoir.

12 Claims, 2 Drawing Sheets

DIESEL-EXHAUST-FLUID REFILL DETECTION

TECHNICAL FIELD

The present invention is drawn to a system and a method for detecting a level of diesel-exhaust-fluid in a reservoir provided for a diesel engine in order to facilitate a refill of the reservoir.

BACKGROUND

A diesel-exhaust-fluid is typically an aqueous solution of urea that is used in a process called selective catalytic reduction (SCR) to reduce emissions of oxides of nitrogen ($NO_X$) from the exhaust of diesel engines employed in motor vehicles. Although the urea solution employed for such purposes generally contains high-purity urea dissolved in demineralized water and is non-toxic and safe to handle, the solution can be corrosive to some metals. Accordingly, such a urea solution must be stored and transported using containers that are manufactured from appropriate inert materials.

An SCR-equipped vehicle typically carries its urea solution onboard in a specially designed reservoir. The urea solution is dosed into the SCR system during engine operation at a rate equivalent to 3-5% of consumption of the diesel fuel. Such a low dosing rate ensures significant periods between refills and minimizes the reservoir's impact on chassis space. On-highway SCR systems are currently in use throughout Europe, in Japan, Australia, Hong Kong, Taiwan, Korea, New Zealand and Singapore. The United States Environmental Protection Agency (US EPA) will limit $NO_X$ by a legislative enactment to levels that will require North American trucks to be equipped with SCR post-2010.

SUMMARY

A method is provided for detecting a level of diesel-exhaust-fluid (DEF) in a reservoir that is operatively connected to a catalyst for a diesel engine. The method is employed in a vehicle in order to facilitate a refill of the reservoir. The method includes sensing a level of diesel fuel in a fuel tank via a sensor operatively connected to the tank. The method also includes determining whether the vehicle is on an incline using the sensed level of diesel fuel in the fuel tank. The method additionally includes determining the level of DEF in the reservoir if the vehicle is determined to be substantially not on an incline. A system for detecting a level of DEF in the reservoir is also provided.

The acts of sensing a level of diesel fuel in the fuel tank, and determining the level of DEF in the reservoir may be executed by a controller operatively connected to each of the tank, the sensor, and the reservoir.

The method may also include using the controller to generate a sensory signal indicative of a required refill of the reservoir.

The act of determining whether the vehicle is on an incline may include determining a magnitude of the incline such that the vehicle is termed as being substantially not on an incline when the magnitude of the determined incline is below a predetermined value. Such a predetermined value may be equal to approximately 10 degrees.

The act of determining whether the vehicle is on an incline may include comparing a level of fuel sensed during the most recent instance in which the vehicle was not on an incline and a level of fuel sensed currently. The level of fuel sensed during the most recent instance in which the vehicle was not on an incline may be a level of fuel sensed during a fuel-fill event.

The act of sensing a level of diesel fuel in the fuel tank may be performed continuously.

A system is also provided for detecting a level of DEF in a reservoir that is operatively connected to a catalyst for a diesel engine.

The above features and advantages and other features and advantages of the present invention are readily apparent from the following detailed description of the best modes for carrying out the invention when taken in connection with the accompanying drawings.

DETAILED DESCRIPTION

Selective catalytic reduction (SCR) is a means of converting oxides of nitrogen, also referred to as $NO_X$ with the aid of a catalyst into diatomic nitrogen, $N_2$, and water, $H_2O$. A gaseous reductant, typically anhydrous ammonia, aqueous ammonia or urea, is added to a stream of exhaust gas and is absorbed onto the catalyst. Carbon dioxide, $CO_2$, is a reaction product when urea is used as the reductant. SCR is frequently employed to reduce $NO_X$ emissions in the exhaust of diesel engines used to power motor vehicles. When used as a reductant in diesel engines, urea is generally termed "diesel-exhaust-fluid" or DEF.

Figure 1:
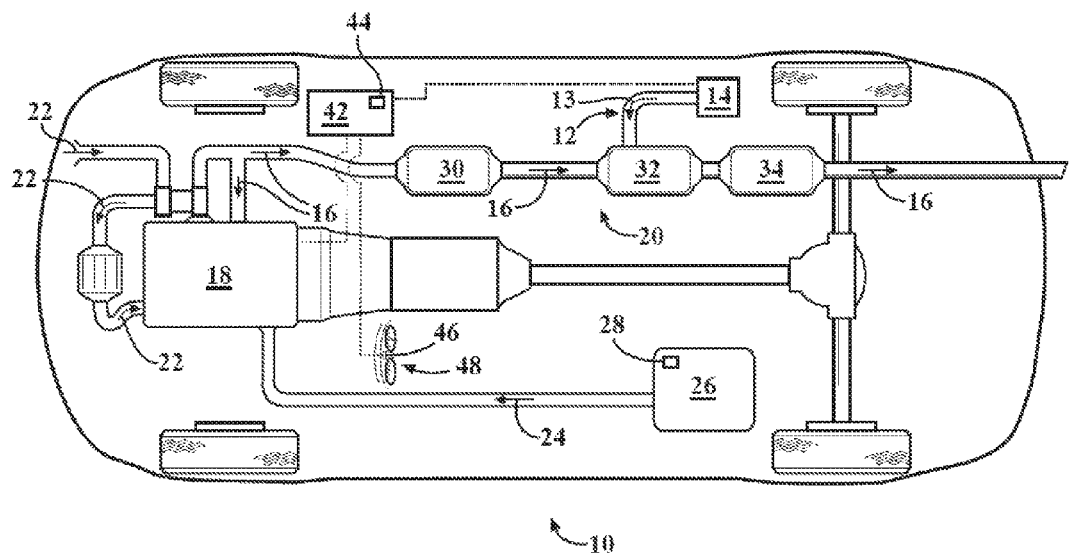
FIG. 1 is a schematic illustration of vehicle with an engine connected to an exhaust system having an exhaust after-treatment device.

Referring to the drawings, wherein like reference numbers refer to like components throughout the several views, FIG. 1 schematically depicts a motor vehicle 10. The vehicle 10 includes a system 12 configured to detect a level of DEF 13 contained in a reservoir 14 for metered supply to a stream of exhaust gas 16. The system 12 includes an internal combustion diesel engine 18. Exhaust gas 16 is emitted from the engine 18 as a by-product of combustion, and is removed to the ambient through an exhaust system 20. As shown, the engine 18 is a compression ignition, i.e., a diesel, engine. The internal combustion in diesel engine 18 occurs when a specific amount of ambient air flow 22 is mixed with a metered amount of fuel 24 supplied from a fuel tank 26 and the resultant air-fuel mixture is compressed inside the engine's cylinders (not shown). The fuel tank 26 includes a sensor 28 configured to establish or sense a level of fuel 24 inside the fuel tank. The sensor 28 may operate to sense the level of fuel 24 inside the fuel tank 26 on a continuous basis.

As shown in FIG. 1, exhaust system 20 includes a series of exhaust after-treatment devices, shown as a diesel oxidation catalyst 30, a selective catalytic reduction (SCR) catalyst 32, and a diesel particulate filter 34. The shown series exhaust after-treatment devices 30, 32, and 34 is employed to reduce various exhaust emissions of engine 18. In particular, the diesel oxidation catalyst 30 is adapted to receive exhaust gas 16 from the engine 18 to oxidize and burn hydrocarbon emissions present in the exhaust gas. Following the diesel oxidation catalyst 30, the exhaust gas 16 is routed to the SCR catalyst 32, which is employed to reduce the emission of $NO_X$. The reservoir 14 supplies DEF 13 to the stream of exhaust gas 16 as the exhaust gas flows through SCR catalyst 32 to thereby facilitate the reduction of $NO_X$. After the exhaust gas 16 exits the SCR catalyst 32, but before it is allowed to pass to the atmosphere, the gas is routed through the diesel particulate filter 34 where the sooty particulate matter emitted from the engine 18 is collected and disposed. Although, as shown, the SCR catalyst 32 is positioned upstream of the diesel particulate filter 30, the SCR catalyst may also be positioned downstream of the diesel particulate filter without affecting the effectiveness of the exhaust aftertreatment devices 30, 32, and 34 in the after-treatment of the exhaust gas 16.

Figure 2:
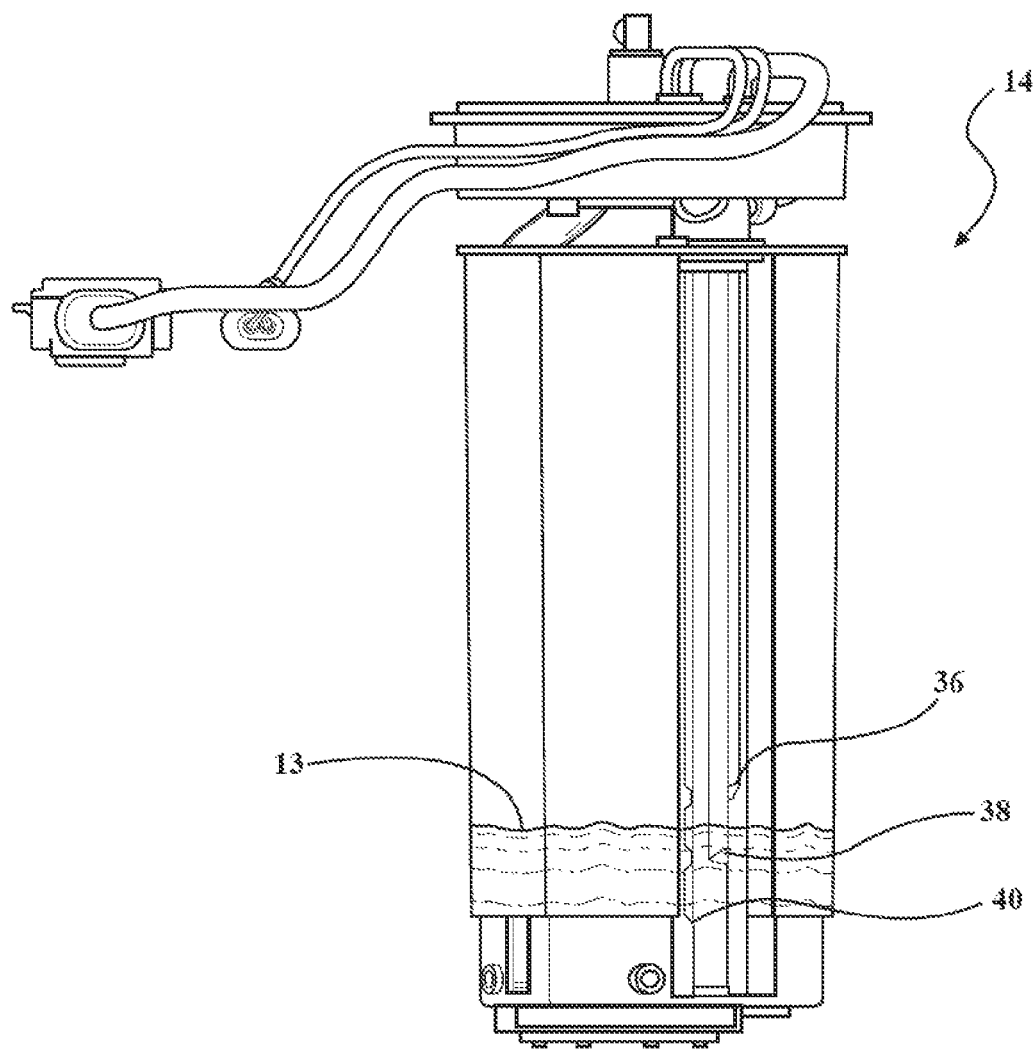
FIG. 2 is a schematic illustration of a reservoir for holding a diesel-exhaust-fluid (DEF)

As shown in FIG. 2, reservoir 14 includes three discrete pins that are spaced at different heights within the reservoir—a pin 36 that is positioned at the highest level in the reservoir, a pin 38 that is positioned below the pin 36, and a pin 40 that is positioned below the pin 38. The pins 36, 38, and 40 are configured to detect a presence of the DEF 13 within the reservoir 14 in order to facilitate a determination of the level of the DEF and to set an alert or indicator of when a refill of the reservoir 14 is required. Hence, the level of DEF 13 is approximated based on which of the three pins 36, 38, 40 is covered by the DEF. Such discrete pins are employed in the reservoir 14 instead of a level sensing arrangement that may be capable of continuous fluid level detection, for example similar to the sensor 28, because of the salt deposits that are typically formed by the urea-based DEF. However, when the vehicle 10 is on an incline, the level approximated with the aid of pins 36, 38, 40 may include significant error. Such error may be sufficient to prevent reliable assessment as to the proper instance for the refill of DEF 13, and of the volume required.

Referring back to FIG. 1, the system 12 also includes a controller 42 that is operatively connected to engine 18. The controller 42 is operatively connected to each of the fuel tank 26, the sensor 28, and the reservoir 14. The controller 42 is programmed to receive a signal from sensor 28 indicative of the sensed level of fuel 24 in the fuel tank 26. The controller 42 is also programmed to determine whether vehicle 10 is positioned on an incline or driving in an inclined state using the signal indicative of the sensed level of fuel 24 in the fuel tank 26. The controller 42 may be a stand-alone unit, or be part of an electronic controller that regulates the operation of engine 18.

The controller 42 is additionally programmed to determine the level of DEF 13 in the reservoir 14 if the vehicle 10 is determined to be substantially not on an incline, i.e., substantially level or in a horizontal plane. Whether the vehicle 10 is substantially not on an incline may be established via a determination of the level of diesel fuel 24 in the fuel tank 26 during the most recent instance in which the fuel tank was replenished during a fuel-fill event. To determine whether or not the vehicle 10 is currently on an incline, the controller 42 may be programmed to compare a level of fuel 24 sensed during the most recent instance the vehicle was not on an incline and the level of fuel 24 sensed by the sensor 28 currently. Based upon the knowledge of the physical characteristics of the fuel tank 26, the difference between the fuel level sensed during the most recent filling event and the currently sensed level may be used to infer or calculate to a reasonable certainty the magnitude of the incline that the vehicle is on at the present time.

When the vehicle 10 is in motion it may traverse non-flat ground, and, as such, sensor 28 may indicate a level of fuel 24 in the fuel tank 26 that is greater or smaller than actual. Likewise, as described above, when the vehicle 10 is on an incline, the level of DEF 13 in the reservoir 14 may be indicated erroneously. On the other hand, it may generally be assumed that during a fuel-fill event at a fuel filling station vehicles are positioned substantially in a horizontal plane, such as within 1-2 degrees from horizontal. The determination that currently the vehicle 10 is substantially not on an incline may be generated if the magnitude of the calculated incline is below a predetermined value 44. In a non-limiting example, such a predetermined value may be up to approximately 10 degrees in order to provide a reasonable tolerance band for refilling reservoir 14 with DEF 13.

The value 44 may be predetermined empirically during the testing and development of the vehicle 10 to ensure that the reading of the level in DEF 13 at such an incline does not generate a significant unwanted error. The value 44 may also be programmed into controller 42. The controller 42 may additionally be programmed to generate a sensory signal 46 indicative of a required refill of the reservoir 14 with DEF 13. Such a sensory signal 46 may be displayed on an instrument panel 48 of the vehicle 10 as a visual alert in order to notify the vehicle's operator of the required refill of the reservoir 14.

Figure 3:
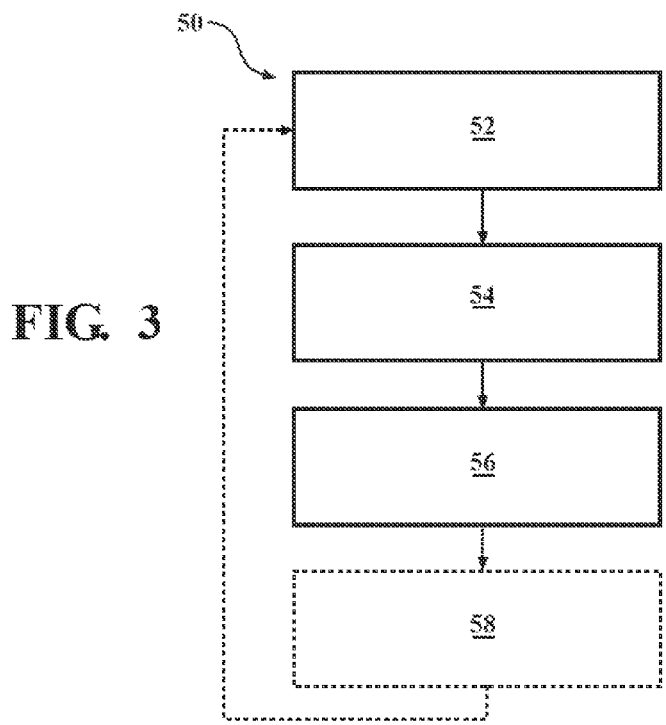
FIG. 3 is a flow diagram of a method for controlling regeneration of the exhaust after-treatment device of FIG. 1.

FIG. 3 depicts a method 50 of detecting a level of DEF 13 in reservoir 14 as described with respect to FIG. 1. Accordingly, the method commences in frame 52, where it includes sensing a level of diesel fuel 24 in the fuel tank 26 via sensor 28. Following frame 52, the method proceeds to frame 54, where it includes determining whether the vehicle 10 is on an incline using the sensed level of diesel fuel 24 in the fuel tank 26.

As described with respect to FIG. 1 above, the determination of whether the vehicle 10 is on an incline may include determining a magnitude of the incline. Accordingly, the vehicle 10 may be termed as being substantially not on an incline when the magnitude of the determined incline is below the predetermined value 44. The determination of whether the vehicle 10 is on an incline may additionally include comparing a level of fuel 24 in the fuel tank 26 that was sensed during the most recent instance in which the vehicle was not on an incline, such as during a fuel-fill event, and a level of the fuel sensed currently.

After the determination of whether vehicle 10 is on an incline is made in frame 54, the method advances to frame 56. In frame 56, the method includes determining the level of DEF 13 in reservoir 14 if the vehicle 10 is determined to be substantially not on an incline. Following frame 56, the method 50 may proceed to frame 58, where the method includes using controller 42 to generate the sensory signal 46 indicative of a required refill of the reservoir 14. Following frame 58, and after the refill of the reservoir 14 has been accomplished, the method may loop back to frame 52 and restart the detection of the level of DEF 13 in the reservoir.

While the best modes for carrying out the invention have been described in detail, those familiar with the art to which this invention relates will recognize various alternative designs and embodiments for practicing the invention within the scope of the appended claims.

The invention claimed is:

1. A method of detecting a level of diesel-exhaust-fluid (DEF) in a reservoir operatively connected to a catalyst for a diesel engine employed in a vehicle, comprising:

sensing a level of diesel fuel in a fuel tank via a sensor operatively connected to the tank;

determining, via a controller operatively connected to each of the fuel tank, the sensor, and the reservoir, whether the vehicle is on an incline using the sensed level of diesel fuel in the fuel tank; and determining, via the controller, the level of DEF in the reservoir if the vehicle is determined to be substantially not on an incline;

wherein said determining whether the vehicle is on an incline includes comparing a level of the diesel fuel sensed during the most recent instance in which the vehicle was not on an incline and a sensed present level of the diesel fuel.

2. The method according to claim 1, further comprising using the controller to generate a sensory signal indicative of a required refill of the reservoir.

3. The method according to claim 1, wherein said determining whether the vehicle is on an incline includes determining a magnitude of the incline such that the vehicle is termed as being substantially not on an incline when the magnitude of the determined incline is below a predetermined value.

4. The method according to claim 3, wherein the predetermined value is equal to approximately 10 degrees.

5. The method according to claim 1, wherein the level of fuel sensed during the most recent instance in which the vehicle was not on an incline is a level of fuel sensed during a fuel-fill event.

6. The method according to claim 1, wherein said sensing a level of diesel fuel in the fuel tank is performed continuously.

7. A system for detecting a level of diesel-exhaust-fluid (DEF) in a vehicle, comprising:
   a diesel engine employed to power the vehicle;
   a fuel tank connected to the engine and configured to supply fuel to the engine;
   a sensor configured to sense a level of fuel in the fuel tank;
   a catalyst connected to the engine for treating an exhaust gas of the engine;
   a reservoir for holding the DEF and configured to supply the DEF to the catalyst; and
   a controller operatively connected to each of the fuel tank, the sensor, and the reservoir, and programmed to:
      receive a signal indicative of the sensed level of fuel in the fuel tank;
      determine whether the vehicle is on an incline using the sensed level of diesel fuel; and
      determine the level of DEF in the reservoir if the vehicle is determined to be substantially not on an incline;
   wherein the determination of whether the vehicle is on an incline includes a comparison by the controller of a level of the diesel fuel sensed during the most recent instance in which the vehicle was not on an incline and a sensed present level of the diesel fuel.

8. The system according to claim 7, wherein the controller is additionally programmed to generate a sensory signal indicative of a required refill of the reservoir.

9. The system according to claim 7, wherein the determination whether the vehicle is on an incline includes a determination of a magnitude of the incline such that the vehicle is termed as being substantially not on an incline when the magnitude of the determined incline is below a predetermined value.

10. The system according to claim 9, wherein the predetermined value is equal to approximately 10 degrees.

11. The system according to claim 7, wherein the level of fuel sensed during the most recent instance in which the vehicle was not on an incline is a level of fuel sensed during a fuel-fill event.

12. The system according to claim 7, wherein the sensor senses the level of diesel fuel in the fuel tank continuously.

\* \* \* \* \*